United States Patent

[11] 3,613,066

[72] Inventor Charles R. Cooreman
Columbes, France

[21] Appl. No. 769,520
[22] Filed Oct. 22, 1968
[45] Patented Oct. 12, 1971
[73] Assignee Compagnie Internationale Pour L'Informatique
Les Clayes-sous-Bois, France
[32] Priority Oct. 26, 1967
[33] France
[31] 125983
Continuation-in-part of application Ser. No. 540,996, Apr. 7, 1966.

[54] COMPUTER INPUT EQUIPMENT
7 Claims, 1 Drawing Fig.

[52] U.S. Cl. .......... 340/347, 178/18
[51] Int. Cl. .......... G08c 9/06
[50] Field of Search .......... 340/347; 178/18; 88/74; 250/221, 222

[56] References Cited

UNITED STATES PATENTS

| | | | |
|---|---|---|---|
| 3,335,285 | 8/1967 | Gally, Jr. et al. | 250/221 |
| 3,500,063 | 3/1970 | Reno et al. | 250/222 |
| 3,512,888 | 5/1970 | Humphrey | 250/221 |
| 2,769,374 | 11/1956 | Sick | 88/74 |
| 3,128,340 | 4/1964 | Harmon | 178/18 |
| 3,313,944 | 4/1967 | Muir | 340/347 X |
| 3,360,654 | 12/1967 | Muller | 250/221 |

*Primary Examiner*—Maynard R. Wilbur
*Assistant Examiner*—Gary R. Edwards
*Attorney*—Kemon, Palmer & Estabrook

ABSTRACT: In a computer input equipment comprising a display panel and means responsive to the positions and moves of a pointer on said panel for generating information signals for the computer, thin coherent light beams parallel to the surface of said panel are systematically and repetitively displaces in crossing relation to scan part at least of said surface.

PATENTED OCT 12 1971
3,613,066
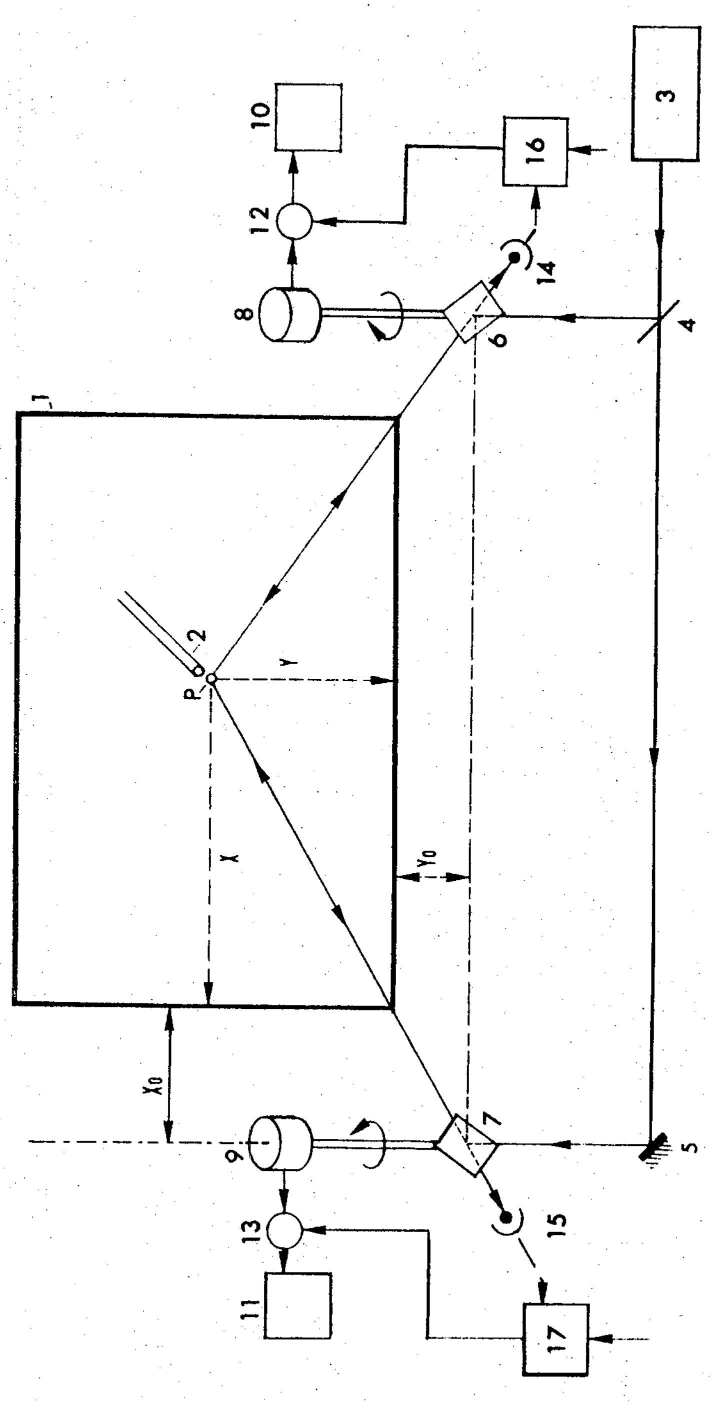
INVENTOR
Kemon Palmer & Estabrook
ATTORNEYS

COMPUTER INPUT EQUIPMENT

SHORT SUMMARY

This is a continuation-in-part of U.S. patent application Ser. No. 540,996 which has been filed Apr. 7, 1966 by the same applicant. Said prior application concerns an electronic computer input equipment of the kind which supplies to the computer information related to the positions and moves of a pointer on a panel. The panel may form part of a display device on which there appears a display of data supplied from the computer, which may be a function of the information supplied to said computer by the input device after processing within the computer.

More precisely, said application provides for an equipment including light source means for forming light beams and directing said light beams across said panel parallel to the surface of said panel, respective light sensitive means positioned for response to each of said light beams, scanning means associated with said light source means or said light sensitive means or both said light source means and said light sensitive means for causing or simulating cyclical scanning of said surface of said panel by said light beams, said pointer being opaque and displaceable across said surface of said panel and towards and away from a position for interception of said light beams, and encoding means for deriving from the outputs of said light sensitive means electric digital output signals which are functions of coordinates of the position of said pointer on said panel for supply to said computer.

It is an object of the present invention to so improve such equipments that they are specially adapted to panels having a relatively wide surface without any practical limitations of the spreading of the field of analysis scanned by the light source and (or) light sensitive means.

According to a feature of the present invention, said light source means comprises sources generating very thin and negligibly diverging light beams of a coherent light such as, for instance, Lasers.

According to a further feature of the invention, said scanning means are so provided as to ensure an angular scanning of the surface of said panel across a predetermined angular sector from at least two such relatively crossing beams.

According to a further feature of the invention, said pointer is provided with such optical means as light autocollimating means for reflecting each received light beam along the same direction as the impinging light beam to a light sensitive receiver always and permanently orientated in said direction of reflected light.

According to a further feature of the invention, said encoding means comprises as many encoders mechanically linked to the mechanical members driving said light beams in angular repetitive displacements, and the output of each encoder is gated from the signal responsive to the fall of the light beam, when reflected, on the corresponding light receiver.

According to a further feature of the invention, said scanning means includes small size mirrors all of which are driven simultaneously in an angular displacement, which may or not reach 360°, at a preferably uniform speed and in a repetitive fashion.

According to a further feature of the invention, said light beams are all generated from a single light source from a suitable arrangement of mirrors and (or) prisms inserted between said source and said scanning mirrors.

SHORT DESCRIPTION OF DRAWINGS

These and further features will be described in full detail with reference to the single FIGURE of the attached drawings which shows, in a somewhat schematic representation, an illustrative embodiment according to the invention.

DETAILED DESCRIPTION

In this embodiment, the panel or table 1 is shown rectangular and adapted for interpretating the positions of a pointer 2 according to the two usual cartesian coordinates X and Y. Obviously, other systems of coordinates may be used without departing from the scope of the invention.

Any point P the coordinates of which must be converted into digital signals to supply to the computer (not shown) may be pointed from a pointer 2 the human operator will handle substantially perpendicularly to the plane of the panel 1. The end of said pointer near the surface of the panel is provided with an optically reflecting autocollimating surface such for instance and as well known, small beads of glass glued on an adhesive ribbon. Illustratively, one may use for such autocollimating material the commercial one sold by Minnesota Mining and Manufacturing Company under the denomination "3M projecting screen of high intensity type 582." Any light beam impinging on such a material is reflected in the very direction from which it comes.

3 is a source of coherent light which may be advantageously made by a so-called LASER generating a monochromatic light beam which is, per se, very thin and of practically negligible divergency. Said light beam is directed through an optical path including, in series relation, a first semireflecting semitranslucent mirror 4 and a second full reflection mirror 5. Said mirrors are 45° slanted for instance, and consequently produce the generation of two secondary light beams of approximately identical light intensity, falling on two other mirrors 6 and 7. Said mirrors 6 and 7, which are plane and of small size, are slanted by a predetermined angle with respect to the direction of one edge of the panel, as shown and with respect to the horizontal line (considering the panel in a horizontal plane). Consequently, they permanently reflect the received light beams in a plane parallel to the plane of the panel 1 and which must be understood as being close to the plane of said panel. Illustratively, the mirrors 4 and 5 may be located practically under the mirrors 6 and 7, the light beams between mirrors 4–5 and 6–7 being then substantially vertical, the light primary beam from 3 through 4 and to 5 then being substantially horizontal and parallel to the plane of the panel anyway.

The mirrors 6 and 7 are each driven in permanent rotation from any driving device which is not shown; for instance from an electrical motor. They could as well be driven in an oscillatory movement from correspondingly moving electrical motors, if desired. Obviously, in either case, uniform rotation of oscillatory motion, the result is a scanning of the panel by two separate and crossing light beams.

Two light sensitive receivers, such for instance as photomultiplier cells, 14 and 15 are mechanically linked to the mirrors 6 and 7 with such relative positions that at any time instant, such cells will receive back the reflected light from the pointer 2 through said mirrors which may be, for such reception, either translucent or bored with a central hole.

Further two digital encoders 8 and 9, for instance magnetic encoders as known, are also linked to the mirrors 6 and 7 and are consequently angularly moved with said mirrors. Such encoders are known in the art for delivering permanently (at least semipermanently, i.e. from discrete to discrete positions) signals which, in the equipment will be representative of the angle of the tangent of the angle defined by the instantaneous angular position of the mirrors with a reference plane which may, in a simple fashion, be a plane passing through the centers of said mirrors (as indicated in dot line on the drawing).

The receiver cells 14 and 15 have their outputs connected to the control inputs of gates 12 and 13 through amplifiers 16 and 17. The information inputs of the gates 12 and 13 are connected to the outputs of the encoders 8 and 9. The outputs of the gates 12 and 13 are connected to digital code registers 10 and 11. Said registers may be considered as being external stores for the computer or as being input date registers of the computer (not shown). Obviously, the gates 12 and 13 will admit the digital codes from 8 and 9 to pass within said registers 10 and 11 only during the time intervals the receiver cells 14 and 15 will be lighted by the light reflected from the pointer.

As long, as they scan the surface of the panel and do not meet a pointer such as 2, the beams from the mirrors 6 and 7 do not have any action on the receivers 14 and 15. When they fall on the pointer, their lights are reflected back through the mirrors on the receivers which are activated for unblocking the gates 12 and 13 and consequently the signal codes from the encoders 8 and 9 are introduced into the code registers 10 and 11. Said digital codes represent the values of the angles between the beams and the reference line as herein above defined or, better, the values of the tangents of said angles.

Though outside the scope of the invention proper, it is preferable to explain how such data will be converted within the digital computer into digital codes representative of the cartesian coordinates X and Y of the position of the pointer 2 on the panel. Denoting $D_0$ the distance between the centers of the mirrors 6 and 7, and denoting $X_0$ and $Y_0$ the origin abscissa and ordinate as defined in the drawing, denoting $a_1$ the value of the angle from which point P is seen from the center point of mirror 7 and $a_2$ the value of the angle from which said point P is seen from the center point of the mirror 6, the coordinates of said point P are given by the relations:

1. $X=(\tan a_2 . D_0/\tan a_1+\tan a_2)-X_0$,
2. $Y=(\tan a_1 . \tan a_2 . D_0/\tan a_1+\tan a_2)-Y_0$.

It is obvious for any man of the art, that these relations directly applicable in any kind of programmation system in any digital computer. The same would be true if, instead of considering the above parameters, other parameters would be used for defining X and Y coordinates from tangent values of angles sent to the computer.

It may be noted that the encoders, instead of being digital ones, could be taken as being analog encoders. In such case, each one of the registers 10 and 11 will consist in an evolutive analog store as is as well known as digital registers. Analog-to-digital converters will then be used in the input equipment of the computer, in a fashion which is too conventional to be described here.

The panel may be a display one of the information sent back from the computer and in such a case, the display control may be made according to any known fashion, for instance as already described in the prior application for patent herein above mentioned.

Numerous modifications may be brought to the above described embodiment without departing from the spirit and scope of the invention. For instance, as many light sources 3 as are beams for scanning the surface of the panel 1 may be provided instead of a single source and mirror arrangement for routing the single initial beam and dividing it into several ones. Prisms may be substituted and (or) combined with mirrors for the optical equipment of the device. The encoders of analog potentiometers may be operative as concerned their outputs only in sectoral areas; and so forth. Actually, then, any embodiment comprising means for scanning a surface with at least two thin monochromatic coherent light beams in relative crossing relation, means for reflecting the light beams on a obstacle such as a pointer provided with such reflecting means onto light sensitive receivers, and digital or analog responsive signal means the outputs of which are controlled from the said receivers and wherein said scanning means further to the beams also drive the receivers and responsive signal means, falls within the scope of the invention as defined by the appended claims. It must be noted that the recourse to Laser sources as light generating beams presents the advantage of supplying a light of sufficient energy not to be affected by passing through semitranslucent mirrors or prisms and not to be affected by the stray ambient light in the room where the equipment operates.

What is claimed is:

1. Computer input equipment comprising in combination:
   - a panel;
   - an opaque pointer provided with a reflecting light autocollimating surface reflecting any impinging light in the same direction from which it comes;
   - a source of monochromatic, high energy, thin and substantially nondiverging light-beams;
   - respective light-sensitive means positioned for response to each of said light beams when reflected by said autocollimating surface of the pointer;
   - means for scanning the surface of said panel with the intersection of said light beams, said beams being angularly oriented with respect to the edges of said panel; and
   - encoding means responsive to the interception of the light of said beams by said reflecting pointer to deliver electrical signals which are functions of coordinates of the position of said pointer over said panel.

2. Computer input equipment according to claim 1, wherein said light reflecting and autocollimating surface on the pointer consists of a plurality of tiny optical beads coating the end of said pointer applied on said panel.

3. Computer input equipment according to claim 1, wherein said light source means include fixed light beam generating means and means for directing said beams to small size optical members driven from said scanning means for angularly displacing the beams from said optical members across the surface of the panel, said scanning means simultaneously driving said optical members, said light sensitive means and said encoding means in said angular displacement of the beams and said light-sensitive means receiving the reflected light through said optical members.

4. Computer input equipment according to claim 3, wherein said optical members are both reflecting and semitranslucent.

5. Computer input equipment according to claim 3, wherein said optical members are reflecting and nontranslucent but drilled with light ducts in their center portions.

6. Computer input equipment, comprising in combination:
   - a panel;
   - an opaque, displaceable, light reflecting, and autocollimating pointer to move over and towards and away from the surface of said panel;
   - a source of monochromatic, high energy, thin and substantially nondivergent light beams;
   - means for directing said light beams in intersecting relation across said panel and parallel to the surface thereof;
   - respective light-sensitive electric means positioned for response to the light reflected from said pointer from said light beams;
   - respective electric signal generating means, responsive to the position of said beams across said panel;
   - gating means for outputs of said signal generating means controlled from the outputs of said light-sensitive means; and,
   - electromechanical means for scanning the surface of said panel with said intersecting beams by driving simultaneously said light beam directing means, said light-sensitive means and said electric signal generating means for cyclically and repetitively sweeping said beams across surface of said panel and delivering at the outputs of said gating means electric signals which are functions of the coordinates of said pointer over said panel.

7. Computer input equipment, as described by claim 6, wherein said source of light is a laser.